United States Patent
Suzuki

(10) Patent No.: US 7,940,333 B2
(45) Date of Patent: May 10, 2011

(54) GRADATION CONTROL APPARATUS AND GRADATION CONTROL METHOD

(75) Inventor: Takashi Suzuki, Hanyu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/711,971

(22) Filed: Feb. 24, 2010

(65) Prior Publication Data

US 2010/0220236 A1    Sep. 2, 2010

(30) Foreign Application Priority Data

Feb. 27, 2009    (JP) .................... 2009-046974

(51) Int. Cl.
*H04N 5/21* (2006.01)
*H04N 1/407* (2006.01)

(52) U.S. Cl. ........ 348/627; 348/672; 348/701; 348/671; 348/607; 382/275; 358/521; 358/522

(58) Field of Classification Search .......... 348/627, 348/607, 687, 672, 701, 671, 254, 252; 382/274, 382/275, 268, 264; 358/521, 522, 447, 3.26, 358/3.27; 345/690, 77
See application file for complete search history.

(56) References Cited

U.S. PATENT DOCUMENTS

| 5,848,181 | A | 12/1998 | Ogata |
| 6,873,441 | B1 * | 3/2005 | Kuwabara et al. ............ 358/3.26 |
| 7,554,535 | B2 * | 6/2009 | Sasaki ........................... 345/206 |
| 7,688,385 | B2 * | 3/2010 | Muto ............................. 348/441 |
| 2007/0025635 | A1 | 2/2007 | Miyazawa |
| 2008/0152223 | A1 | 6/2008 | Maeda |
| 2008/0152227 | A1 | 6/2008 | Miyazawa |
| 2008/0298685 | A1 | 12/2008 | Maeda |

FOREIGN PATENT DOCUMENTS

| JP | 2004-342030 | 12/2004 |
| JP | 2007-53697 | 3/2007 |
| JP | 2008-160417 | 7/2008 |
| JP | 2008-160440 | 7/2008 |

* cited by examiner

*Primary Examiner* — Jefferey Harold
*Assistant Examiner* — Jean W Désir
(74) *Attorney, Agent, or Firm* — Blakely, Sokoloff, Taylor & Zafman LLP

(57) ABSTRACT

According to one embodiment, a gradation control apparatus comprises a coring module configured to change the coring amount of a video signal according to the degree of movement of the video signal, a smoothing module configured to perform a gradation smoothing process on the video signal, and a parameter controller configured to obtain a frame difference histogram as the degree of movement of the video signal and change an effect parameter for the gradation smoothing process according to the result of weighting the histogram.

8 Claims, 4 Drawing Sheets

US 7,940,333 B2

GRADATION CONTROL APPARATUS AND GRADATION CONTROL METHOD

CROSS-REFERENCE TO RELATED APPLICATIONS

This application is based upon and claims the benefit of priority from Japanese Patent Application No. 2009-046974, filed Feb. 27, 2009, the entire contents of which are incorporated herein by reference.

BACKGROUND

1. Field

One embodiment of the invention relates to a gradation control apparatus and a gradation control method which are for images including many moving image components.

2. Description of the Related Art

In recent years, a television (TV) receiving apparatus which receives digital broadcasts has become popular. The TV receiving apparatus extracts a desired packet from a transport stream and decodes the compressed digital video signal in the packet.

The digital video signal is compressed by the MPEG method. When the video signal is decoded, block noise may occur. A coring technique has been proposed which extracts the pixel difference between fields or frames of the digital video signal, determines moving image components, and adaptively controls the noise reduction level according to the determination result (e.g., refer to Jpn. Pat. Appln. KOKAI Publication No. 2007-53697). In the coring control, moving image components are detected from the video signal and the amount of coring (or the noise reduction level) is changed according to the detection level. The degree of moving images is determined by, for example, detecting the histogram of information on the difference between frames and determining the number of pixels not less than a certain level.

Furthermore, the technique for performing a smoothing process on a video signal plain region has also been proposed (e.g., refer to Jpn. Pat. Appln. KOKAI Publication No. 2008-160440). It is known that the technique has the effect of reducing stripes or block noise due to the deterioration of gradation.

However, with the technique disclosed in Jpn. Pat. Appln. KOKAI Publication No. 2008-160440, if the noise reduction effect is increased too much, an image whose degree of moving image is low becomes blurred on the whole.

BRIEF DESCRIPTION OF THE SEVERAL VIEWS OF THE DRAWINGS

A general architecture that implements the various feature of invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

According to one embodiment of the invention, there is provided a gradation control apparatus comprising: a coring module configured to change the coring amount of a video signal according to the degree of movement of the video signal, a smoothing module configured to perform a gradation smoothing process on the video signal, and a parameter controller configured to obtain a frame difference histogram as the degree of movement of the video signal and change an effect parameter for the gradation smoothing process according to the result of weighting the histogram.

According to one embodiment of the invention, there is provided a gradation control method which changes the coring amount of a video signal according to the degree of movement of the video signal, and performs a gradation smoothing process on the video signal, the method comprising: obtaining a frame difference histogram as the degree of movement of the video signal, and changing an effect parameter for the gradation smoothing process according to the result of weighting the histogram.

With the gradation control apparatus and the gradation control method, a frame difference histogram is obtained as the amount of the video signal and the effect parameter for the gradation histogram is changed according to the result of weighting the histogram. Accordingly, setting can be performed for increasing the effect of gradation smoothing as the degree of movement becomes larger and decreasing the effect of gradation smoothing as the degree of movement becomes smaller. This makes it possible to effectively reduce block noise produced in an image with many moving image components without making prominent blur in an image with few moving image components.

Hereinafter, a gradation control apparatus according to one embodiment of the invention will be explained. The gradation control apparatus is incorporated into a TV receiving apparatus which receives digital broadcasts, a video recorder, or a set-top box.

Figure 1:
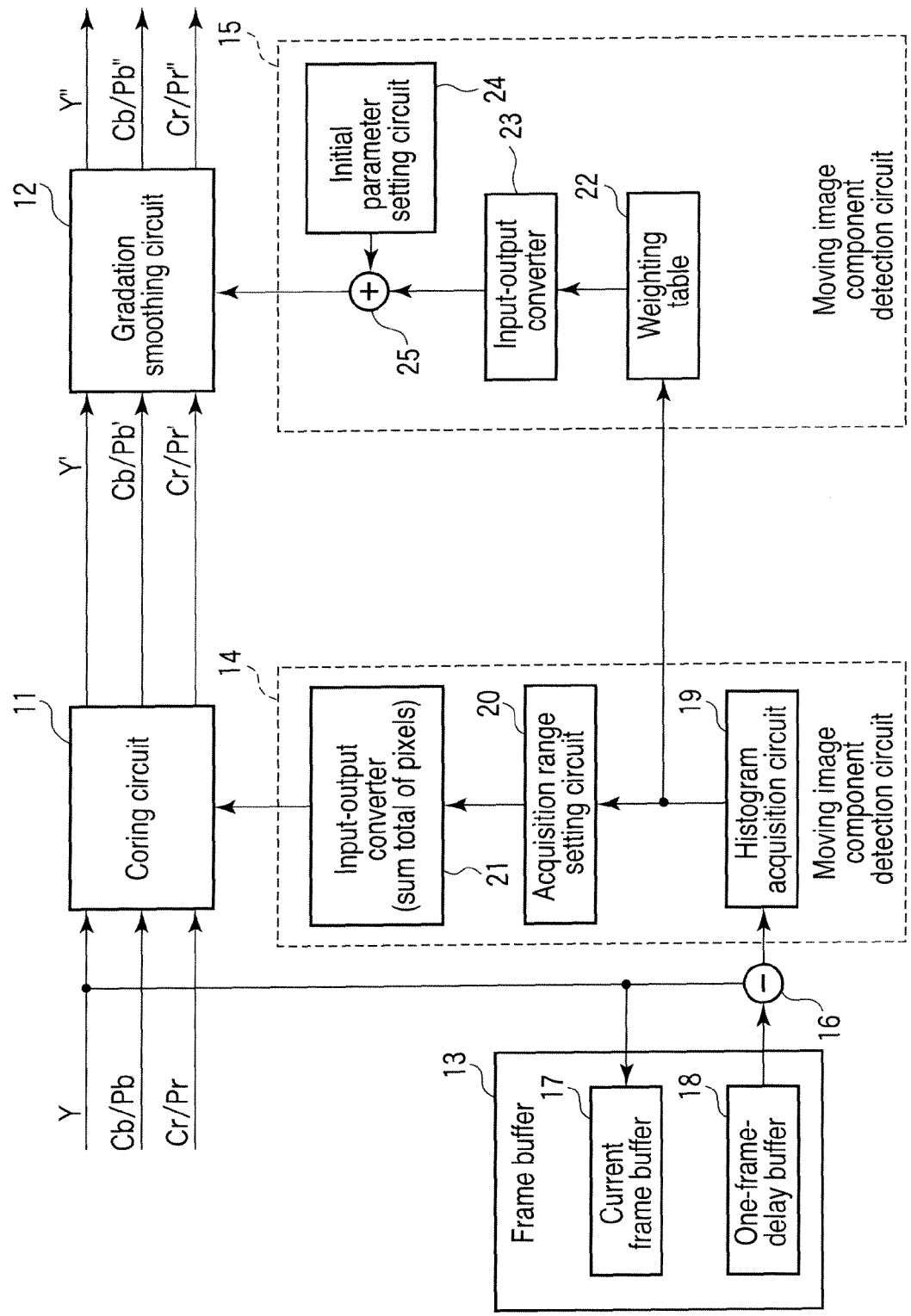
FIG. 1 is an exemplary block diagram schematically showing the configuration of a gradation control apparatus according to an embodiment of the invention.

FIG. 1 schematically shows a configuration of the gradation control apparatus. In the gradation control apparatus, a digital video signal is supplied in the form of, for example, a luminance signal Y, a color signal Cb/Pb, and a color signal Cr/Pr into which the digital video signal has been separated. These signals Y, Cb/Pb, and Cr/Pr are input to a coring circuit (coring module) 11. The coring circuit 11 outputs them as signal Y', Cb/Pb', and Cr/Pr' to a gradation smoothing circuit (smoothing module) 12. The gradation smoothing circuit 12 further outputs them as signal Y", Cb/Pb", and Cr/Pr". The coring circuit 11 may be configured to change the coring amount of the video signal, that is, the coring amount of each of the luminance signal Y, color signal Cb/Pb, and color signal Cr/Pr by the method disclosed in, for example, Jpn. Pat. Appln. KOKAI Publication No. 2007-53697. In addition, the gradation smoothing circuit 12 may be configured to perform a gradation smoothing process on the video signal from the coring circuit 11, that is, each of the signal Y', Cb/Pb', and Cr/Pr' by the method disclosed in, for example, Jpn. Pat. Appln. KOKAI Publication No. 2008-160440.

The gradation control apparatus further comprises a frame buffer 13, a moving image component detection circuit 14, a moving image component detection circuit 15, and a subtractor 16. The video signal, for example, the luminance signal Y, is input to both the frame buffer 13 and subtractor 16. The frame buffer 13 loads the luminance signal Y as image information into a current frame buffer 17 at intervals of one frame period and causes a one-frame-delay buffer 18 to hold the image information with a delay of one frame period. Then, the frame buffer 13 outputs the resulting image information as a delayed luminance signal to the subtractor 16. The subtractor 16 outputs the difference between the delayed luminance signal obtained from the frame buffer 13 and the luminance signal Y to the moving image component detection circuit 14 as a frame difference signal. The moving image component detection circuit 14 includes a histogram acquisition circuit (histogram acquisition module) 19 connected to the subtractor 16, an acquisition range setting circuit 20 connected to the histogram acquisition circuit 19, and an input-output converter 21 connected to the acquisition range setting circuit 20.

Generally, as the number of moving image components of the video signal becomes larger, the proportion of large values in the frame difference signal increases. Accordingly, when a video signal includes many moving image components, the histogram of the frame difference signal tends to concentrate on a larger luminance difference.

The histogram acquisition circuit 19 obtains a histogram representing a frame difference luminance distribution of images from the frame difference signal at intervals of one frame period. The acquisition range setting circuit 20 sets an acquisition range for the histogram obtained from the histogram acquisition circuit 19. The input-output converter 21 finds the sum of frequencies of the acquisition range (number of pixels) set at the acquisition range setting circuit 20 and outputs a coring control signal corresponding to the sum to the coring circuit 11. The coring circuit 11 changes the coring amount of the video signal, that is, each of the luminance signal Y, color signal Cb/Pb, and color signal Cr/Pr, according to the coring control signal.

The histogram of the frame difference signal is also supplied to the moving image component detection circuit 15. The moving image detection circuit 15 includes a weighting table 22 associated with the histogram acquisition circuit 19, an input-output converter 23 associated with the weighting table 22, an initial parameter setting circuit 24, and an adder 25 connected to the input-output converter 23 and initial parameter setting circuit 24. The weighting table 22 multiplies all the histograms of the frame difference luminance distribution obtained from the histogram acquisition circuit 19 by the weighting factors allocated to the respective histograms. The input-output converter 23 finds the sum of the frequencies of all the histograms obtained as the multiplication result from the weighting table 22 and outputs a smoothing control signal corresponding to the sum. The initial parameter setting circuit 24 sets an initial parameter (initial value) prepared as a user setting value or a maker setting value as an effect parameter for the gradation smoothing process. According to the smoothing control signal, the adder 25 gives an offset to the effect parameter for the gradation smoothing process set by the initial parameter setting circuit 24 and outputs the resulting effect parameter to the gradation smoothing circuit 12. The gradation smoothing circuit 12 performs a gradation smoothing process on the video signal from the coring circuit 11, that is, each of the signal Y', Cb/Pb', and Cr/Pr', according to the effect parameter.

Figure 2:
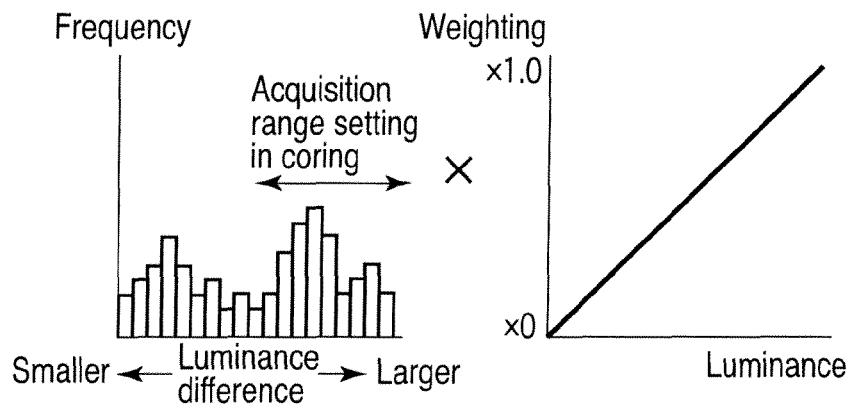
FIG. 2 is an exemplary diagram to explain the operation performed at a histogram acquisition circuit and a weighting table shown in FIG. 1.

Next, parameter control in the gradation smoothing process will be further explained. The histogram acquisition circuit 19 obtains a histogram of the frame difference signal as shown in, for example, FIG. 2. A weighting factor in the weighting table 22 is set to a value that increases monotonically as shown in, for example, FIG. 2. In this case, as the proportion of high difference luminance values becomes greater, the sum of frequencies also increases. That is, as the number of moving image components of the images becomes larger, the sum becomes larger. In the input-output converter 23, the input value of the sum is converted so that the smoothing control signal may optimize control of the gradation smoothing process.

Figure 3:
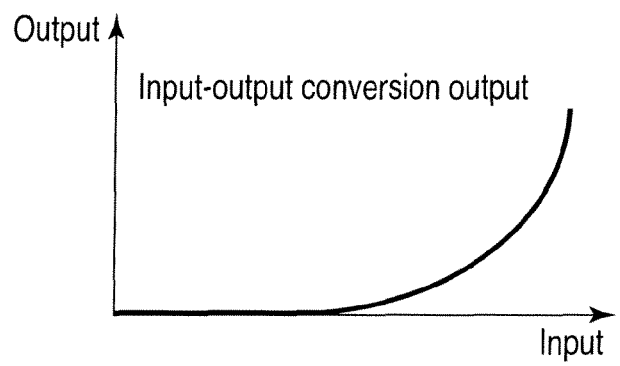
FIG. 3 is a graph showing an example of an output characteristic of an input-output converter provided at the output of the weighting table of FIG. 1.
Figure 4:
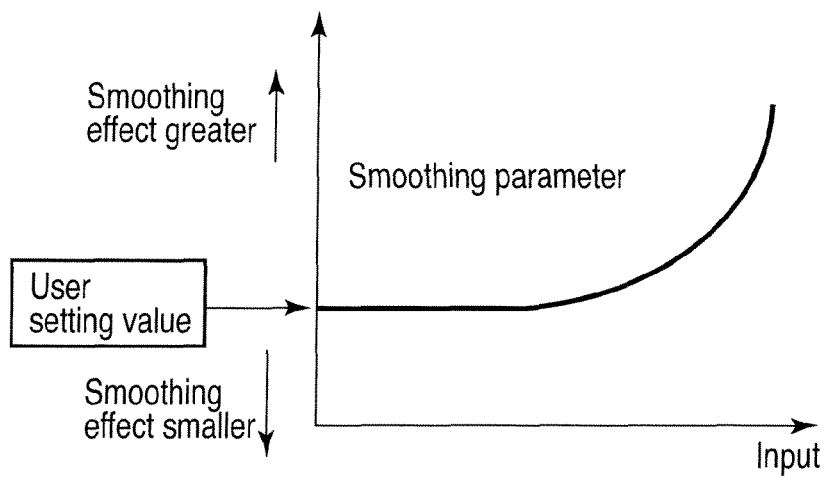
FIG. 4 is an exemplary graph showing an output characteristic of an adder shown in FIG. 1.

FIG. 3 shows an example of an output characteristic of the input-output converter 23. In the output characteristic, the output value is kept at zero in a specific range where the input value is small, whereas the output value is increased exponentially in an input value range exceeding the specific range. This results in that an offset is given to the effect parameter for the gradation smoothing process. When the output of the input-output converter 23 is added to the output of the initial parameter setting circuit 24, the output characteristic of the adder 25 is as shown in FIG. 4. Actually, the output of the adder 25 is supplied to the gradation smoothing circuit 12 as the effect parameter for the gradation smoothing process.

That is, weighting the histogram makes it possible to increase or decrease the effect parameter for the gradation smoothing process according to the moving image components of the video signal. In addition, giving an offset to the effect parameter makes it possible to reliably omit a gradation smoothing process for a video signal with few moving image components.

Figure 5:
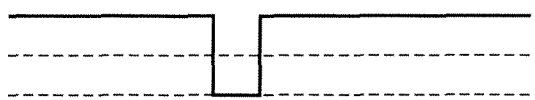
FIG. 5 is an exemplary waveform diagram showing block noise with two shades of gray input to a coring circuit shown in FIG. 1.
Figure 6:
FIG. 6 is an exemplary waveform diagram showing block noise with one shade of gray lowered in level as a result of slicing at the coring circuit shown in FIG. 1.
Figure 7:
FIG. 7 is an exemplary waveform diagram showing the result of the smoothing circuit smoothing block noise with one shade of gray obtained from the coring circuit of FIG. 1.
Figure 8:
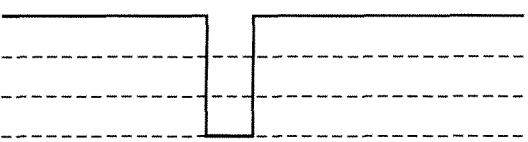
FIG. 8 is an exemplary waveform diagram showing block noise with three shades of gray input to the coring circuit shown in FIG. 1.

Hereinafter, an example of the operation result of the operation of the gradation control apparatus will be explained in comparison with a conventional equivalent. In the case of still images, suppose gradation smoothing is not performed on a signal with more than one shade of gray (1 LSB), taking blur into account. First, a case where block noise can be eliminated even by a conventional technique will be explained. If block noise with two shades of gray as shown in FIG. 5 has occurred in a video signal and the block noise has been input to the coring circuit 11, the coring circuit 11 slices the level of the block noise, thereby producing block noise with one shade of gray one level lower than the original one as shown in FIG. 6. The resulting block noise is further input to the gradation smoothing circuit 12. Then, the gradation smoothing circuit 12 performs a gradation smoothing process on the block noise, thereby producing block noise caused to transit by segmenting the noise at a rate of 2 bits per shade of gray as shown in FIG. 7.

Figure 9:
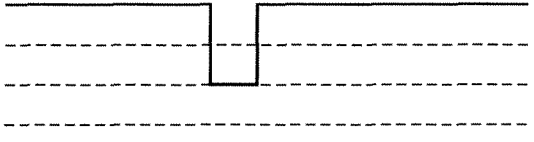
FIG. 9 is an exemplary waveform diagram showing block noise with two shades of gray lowered in level as a result of slicing at the coring circuit shown in FIG. 1.

The following is a case where block noise cannot be eliminated by the conventional technique. If block noise with three shades of gray has occurred in a video signal and the block noise has been input to the coring circuit 11, the coring circuit 11 slices the level of the block noise, thereby producing block noise with two shades of gray one level lower than the original one as shown in FIG. 9. The resulting block noise is further input to the gradation smoothing circuit 12. In this case, if the conventional technique is used, the gradation smoothing circuit 12 does not process a signal with two or more shades of gray, regardless of still or moving images, and therefore performs no smoothing process, with the result that the output of the gradation smoothing circuit 12 has the same waveform as in FIG. 9. However, with the configuration of the embodiment, if the gradation smoothing circuit 12 is set so as to operate as a limiter for two or more shades of gray in a still image or for three or more shades of gray in a moving image, for example, the gradation smoothing circuit 12 can perform a gradation smoothing process on block noise, thereby producing block noise caused to transit by segmenting the noise at a rate of 2 bits per shade of gray as shown in FIG. 10.

Figure 10:
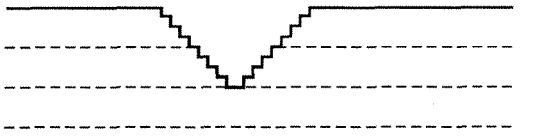
FIG. 10 is an exemplary waveform diagram showing the result of the smoothing circuit smoothing block noise with two shades of gray obtained from the coring circuit of FIG. 1.

That is, when the parameter controller which includes the frame buffer 13, subtractor 16, histogram acquisition circuit 19, weighting table 22, and input-output converter 23 is added, it is possible to perform a gradation smoothing process of FIG. 10 on block noise with a large amplitude as described above, thereby reducing the block noise occurred in an image with many moving image components.

With the gradation control apparatus of the embodiment, a frame difference histogram is obtained as the degree of movement of a video signal and an offset is given to the effect parameter for the gradation smoothing process according to the result of weighting the histogram. Accordingly, it is possible to increase the effect of gradation smoothing as the degree of movement becomes larger and decrease the effect of gradation smoothing as the degree of movement becomes smaller. Consequently, block noise occurred in an image with many moving image components can be reduced effectively without making prominent blur in an image with few moving image components.

The invention is not limited to the above embodiment and may be modified variously.

Figure 11:
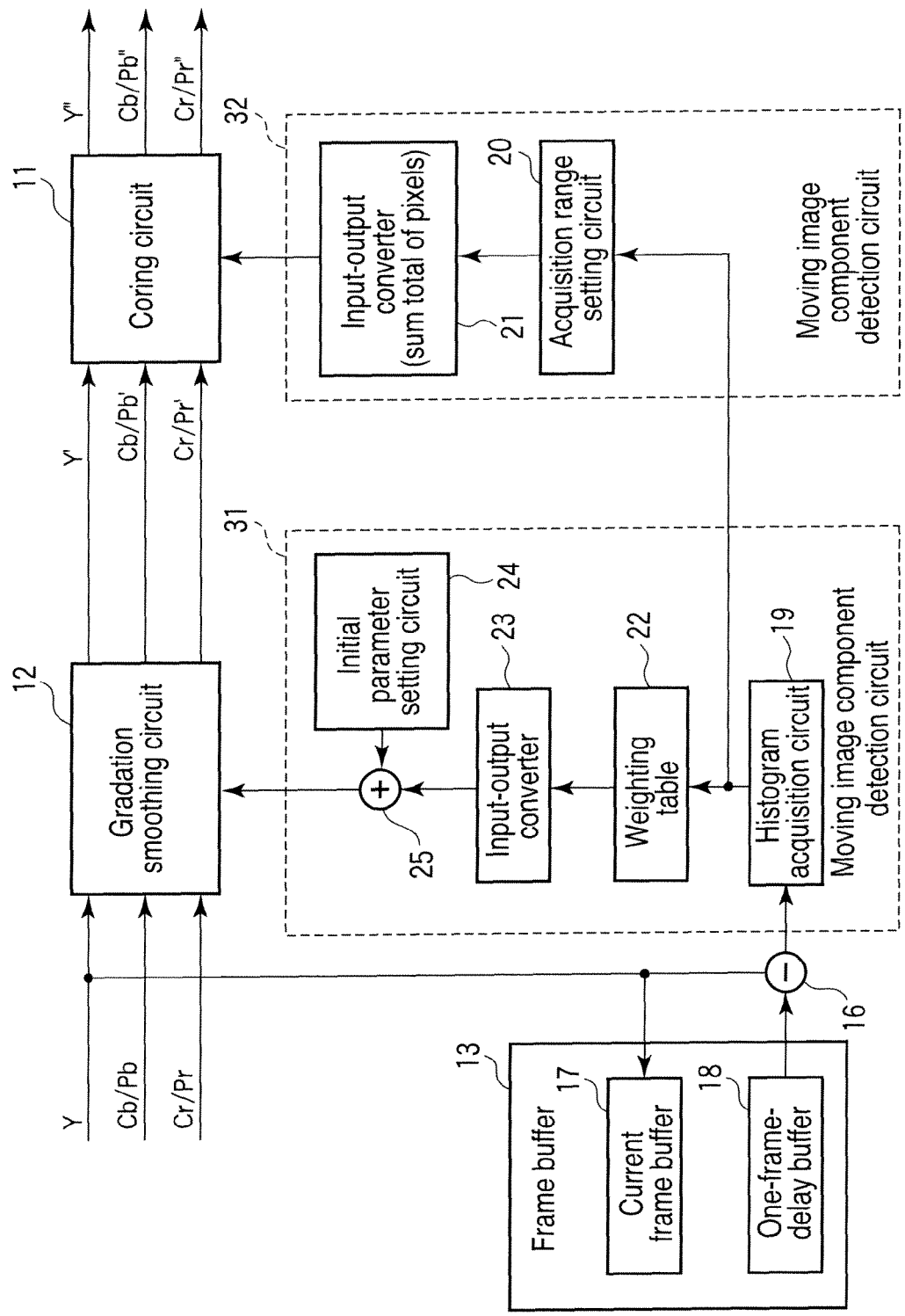
FIG. 11 is an exemplary diagram showing a modification of the gradation control apparatus shown in FIG. 1.

While in the embodiment, the gradation smoothing circuit 12 is provided behind the coring circuit 11, it may be provided in front of the coring circuit 11 as shown in, for example, a modification of FIG. 11. In this modification, the same parts as in the embodiment are indicated by the same reference numerals and an explanation of them will be omitted. Since the coring circuit 11 processes the video image obtained from the gradation smoothing process at the gradation smoothing circuit 12, the gain difference between a still image and a moving image has to be made large. As a result, there is a possibility that the transition between a still image and a moving image will lead to a great change in the image. Taking this into account, it is desirable that the gradation smoothing circuit 12 should be provided behind the coring circuit 11.

The histogram acquisition circuit 19 is provided in a moving image component detection circuit 31 for the gradation smoothing circuit 12 and is omitted in a moving image component detection circuit 32 for the coring circuit 11. The histogram acquisition circuit 19 may be provided in both of the moving image component detection circuits 31 and 32. However, since the moving image component detection circuits 31 and 32 result in the acquisition of the same histogram, the gradation smoothing circuit 12 and coring circuit 11 share the histogram acquisition circuit 19, which reduces the production cost further.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A gradation control apparatus comprising:
a coring module configured to change a coring amount of a video signal such that the coring amount increases as the degree of movement of the video signal becomes higher;
a smoothing module configured to perform a gradation smoothing process on the video signal; and
a parameter controller configured to obtain a frame difference histogram as the degree of movement of the video signal, weight the frame difference histogram so as to have a characteristic in which a frequency increases as a difference value becomes larger, and change an effect parameter for the gradation smoothing process according to a sum of weighted frequencies.

2. The gradation control apparatus of claim 1, wherein the parameter controller is configured to perform the weighting using a weighting factor which increases the effect of gradation smoothing as the degree of movement becomes larger and decreases the effect of gradation smoothing as the degree of movement becomes smaller.

3. The gradation control apparatus of claim 1, wherein the parameter controller gives the parameter for the gradation smoothing process an offset that causes the change of the effect parameter for the gradation smoothing process to be omitted in a specific range where the degree of movement is small.

4. The gradation control apparatus of claim 1, wherein the parameter controller is configured to set an initial value set by the user as the effect parameter for the gradation smoothing process.

5. The gradation control apparatus of claim 1, wherein the smoothing module is provided behind the coring module.

6. The gradation control apparatus of claim 1, wherein the smoothing module is provided in front of the coring module.

7. The gradation control apparatus of claim 1, wherein the parameter controller includes a histogram acquisition module which is provided commonly to the smoothing module and the coring module and obtains a frame difference histogram as the degree of movement of a video signal.

8. A gradation control method which changes a coring amount of a video signal such that the coring amount increases as the degree of movement of the video signal becomes higher, and performs a gradation smoothing process on the video signal, the method comprising:
obtaining a frame difference histogram as the degree of movement of the video signal, and
weighting the frame difference histogram so as to have a characteristic in which a frequency increases as a difference value becomes larger, and changing an effect parameter for the gradation smoothing process according to a sum of weighted frequencies.

* * * * *